Jan. 1, 1935.  A. MEADOWCROFT  1,986,512
MINIATURE WELDING MACHINE
Filed July 14, 1932   2 Sheets-Sheet 1

Inventor
Albert Meadowcroft.

By H. F. Löwenstein
Attorney

Jan. 1, 1935.  A. MEADOWCROFT  1,986,512
MINIATURE WELDING MACHINE
Filed July 14, 1932    2 Sheets-Sheet 2

Inventor
Albert Meadowcroft.

By H. Lowenstein.
Attorney

Patented Jan. 1, 1935

1,986,512

UNITED STATES PATENT OFFICE 1,986,512

MINIATURE WELDING MACHINE

Albert Meadowcroft, Philadelphia, Pa.

Application July 14, 1932, Serial No. 622,421

2 Claims. (Cl. 219—4)

My invention relates in general to welding machines, and more particularly to a toy or miniature spot welding machine.

The main object of the invention is the provision of a toy or miniature spot welding machine operable on the ordinary house lighting circuit to produce effective spot welds without undue loading of such circuit and capable of being handled by children and other unskilled persons for the fabrication of small articles from thin sheet metal. The thin sheet metal may be one especially selected for its appearance and amenability to cutting, bending and spot welding, or simply the sheet tinned iron obtainable from so-called tin cans or the like, which latter has been found to be very satisfactory for the purpose and has the advantage of being readily and cheaply obtainable.

Another object is the provision of a machine of the above qualities which shall be sturdy, strong, efficient and cheap to manufacture.

The above objects of the invention are obtained in general by the provision of a small efficient welding transformer with a pair of welding electrodes and conductors connecting the electrodes with the transformer, all mounted within a unitary support and housing of heat resisting, electrical insulating material, which as a unitary structure forms a housing for the transformer, a supporting arm for one of the welding electrodes, and an insulating housing for the conductor which connects the electrode with the transformer. A movable supporting arm also of heat resisting, electrical insulating material, is provided for the other electrode movably mounted on the main support, and forms as a unitary structure both a supporting arm for the electrode and an insulating housing for the conductor which connects the electrode to the transformer.

This construction is particularly advantageous in a miniature or toy machine in which it makes for safety, efficiency, simplicity, strength and attractiveness, at relatively low cost. For a material having the desired strength, resistance to heat, and electrical insulation quality, I prefer to use a phenolic condensation product such as "Bakelite" or other material having the above qualities and capable of being molded into a strong unitary structure.

The attainment of efficiency together with simplicity and sturdiness is contributed to by the use of a continuous, flexible, large capacity conductor forming both the secondary winding of the welding transformer and the current leads for connecting this winding with the electrodes. This makes for efficiency and sturdiness of structure, firstly by the elimination of contact joints between current leads and the secondary winding per se, secondly by permitting the use of a torus transformer with closed ring-form laminations, and thirdly by eliminating the usual separate flexible joint or section of special flexible conductor between the movable electrode and the stationary portions of the secondary circuit.

The above and other objects and advantages of my invention will appear more clearly hereinafter in the following specification and claims, taken in conjunction with the accompanying drawings which illustrate a suggestive embodiment of the invention in the manner following.

Figure 1:
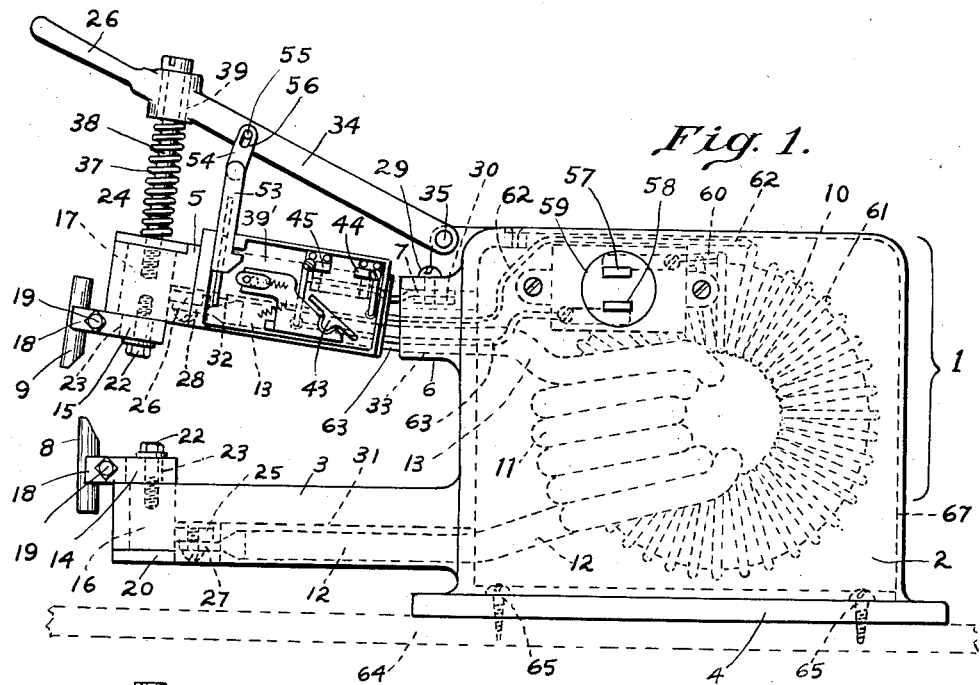
Fig. 1 is a side elevation showing the machine with the parts in normal position.

Referring to the drawings in detail, the main support and housing indicated as a whole at 1, comprises the transformer housing 2, stationary electrode supporting arm 3 and base 4. This main support and housing is a unitary structure molded of a strong, heat resisting, electrical insulating material such as a phenolic condensation product, for example "Bakelite". An upper movable electrode supporting arm 5, in itself a unitary structure molded of material similar to that of the main support and housing, is hingedly secured to the main support at the arm base 6 by means of a flat spring 7. The main support and housing including the lower arm 3, together with the upper or movable arm 5 constitute the supporting frame, housing and insulating means for the various apparatus elements and circuits of the machine.

The lower and upper arms 3 and 5, support the stationary and movable electrodes 8 and 9, respectively, which electrodes are supplied with current from the welding transformer 10 mounted within the transformer housing 2, and having its secondary winding 11 connected through leads 12 and 13 to the stationary and movable electrodes 8 and 9, respectively. Electrodes 8 and 9 are supported on their respective supporting arms for vertical and horizontal adjustment by the electrode holders 14 and 15, and terminal pieces 16 and 17 respectively. Each holder receives its electrode between a pair of clamping arms 18 clamped about the electrode by a clamping bolt 19, which permits removal and replacement, and vertical adjustment of the electrodes. The holders are adjustable horizontally on terminal pieces 16 and 17 by means of the bolts 22 passing through slots 23 in the holders and into threaded openings in the terminal pieces. The electrode holders 14 and 15 also hold the terminal pieces 16 and 17 in place in supporting arms 3 and 5, the terminal pieces extending transversely through the ends of the arms and being held against the clamping pull of the bolts 22 by shoulder pieces 20 and 24. The terminal pieces 16 and 17 are provided with lugs 25 and 26 respectively, to which the current leads 12 and 13 are connected through the usual wide area. terminal lugs 27 and 28 carried by the ends of the leads and bolted to the lugs 25 and 26 respectively, as indicated in dotted lines in Fig. 1.

As shown in dotted lines in Fig. 1, the current leads 12 and 13, and the secondary winding 11 are portions of one continuous large capacity, flexible conductor, preferably of the stranded type, terminating in the lugs 27 and 28 through which they connect with the lugs 25 and 26, respectively.

Figure 2:
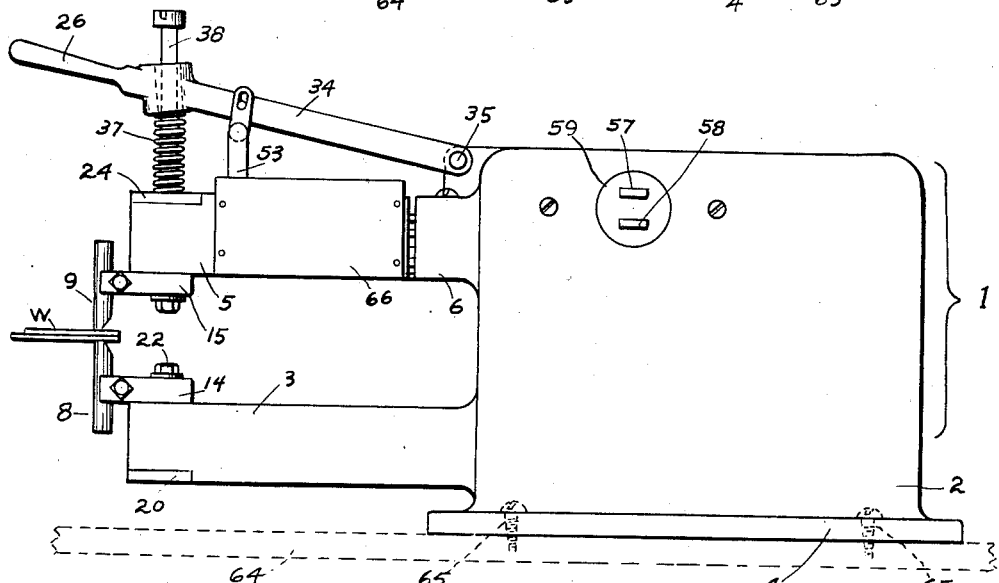
Fig. 2 is a similar view showing the parts in operated position.
Figure 3:
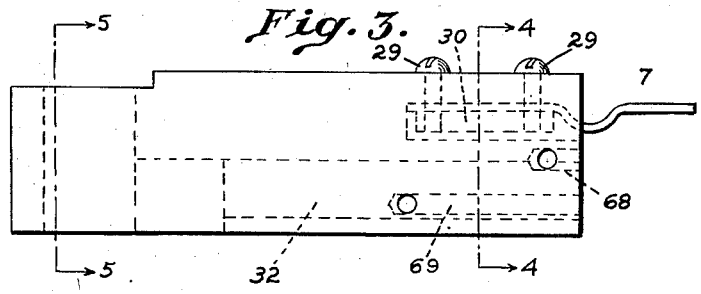
Fig. 3 is a side elevation of the movable arm on a larger scale than that of Fig. 1 and without appurtenances.
Figure 5:
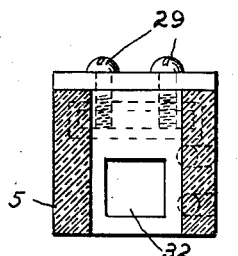
Fig. 5 is a section on line 5—5 of Fig. 3.

The flat spring hinge 7 is secured to the movable arm 5 and arm base 6 in recesses in the arm and arm base by bolts 29 and tap plates 30 as indicated in dotted lines in Fig. 1, and is given such a set as will normally hold the movable arm 5 in the position shown in Fig. 1, with the electrodes 8 and 9 widely separated to permit placing the work between them. The movable arm 5 is thus normally held in the raised position but is capable of being moved down against the tension of the spring hinge 7 to bring the electrodes into clamping engagement with the work W as indicated in Fig. 2. The current lead being flexible, readily bends with the movement of the arm without strain on any of the parts.

The electrode supporting arms 3 and 5, and arm base 6, are provided with channels or ducts 31, 32 and 33, formed in and surrounded by the insulating body material of the supporting arms, for supporting, housing and insulating the current leads 12 and 13 throughout their extension from the transformer to their connection with the terminal pieces 16 and 17. By forming the channels wholly within the body material of the arms, the arms are given a closed, box-section structure which thus prevents the reduction in cross-section from unduly reducing the mechanical strength of the arms.

Downward movement of the movable arm 5 is effected by the operating lever 34, pivoted on the main support at 35 and terminating in an operating handle 36. Motion is transmitted from the lever 34 to the arm 5 through a compression spring 37 mounted on a bolt 38 which passes loosely through a slot 39 in the lever and is secured in the terminal piece 17. This resilient connection between the lever 34 and the movable arm, permits the movable electrode 9 to be moved down into engagement with the work by downward movement of the lever, and with increased pressure after contact proportional to the amount of continued downward movement of the lever, so that for a given continued movement of the lever after contact and consequently a given relative movement between the lever and arm, the work will be subjected to a given clamping pressure between the welding electrodes 8 and 9.

This arrangement enables me to provide for the automatic closure of the primary circuit of the transformer upon attainment of a given predetermined welding pressure on the electrodes, by the placement of a suitable primary circuit control switch 39' on the arm 5 arranged to be actuated upon a given relative movement of the operating lever toward the arm. The switch 39' is of the clapper type mounted in the casing 40, secured to the side of the arm 5, the casing 40 being preferably of the same or like insulating material as that of the main support.

The switch comprises a clapper arm 41 of insulating material pivoted at 42 and carrying at one end a bridging contact 43 arranged upon upward swing of the clapper arm to engage a pair of contact terminals 44—45. A retractile spring 46 holds the clapper arm in its lowermost position against stop 47. The other end of the clapper arm carries a latch 48 pivoted at 49 and held against counter clockwise rotation by a stop 50, the latch being held normally against its stop by retractile spring 51. The left hand end of the latch extends into the path of a trip lug 52 carried on a plunger 53 mounted for vertical sliding movement in the switch casing on a guide rail 54. The plunger with its trip lug, the guide rail and the latch, are preferably of relatively hard metal.

It will be clear from the above description and those portions of the drawings to which it refers, that upon downward movement of the plunger 53 the trip lug 52 will engage the end of the latch 48 swinging it and the clapper arm 41 about the pivot 42 in a counter clockwise direction, the latch being held against movement relative to the clapper arm by the stop 50. When the bridging contact 43 engages contacts 44—45, the latch 48 swinging downwardly and to the right about pivot 42 permits the trip lug 52 to move downwardly past the trip, the flat vertical end of the trip lug continuing to bear against the trip to hold the contact 43 in engagement with contacts 44—45 until further downward movement of the trip lug carries it below the trip, the clapper arm then falling back against the stop 47 under tension of retractile spring 46. Upon return upward movement of the plunger 53, the trip lug 52 engaging the trip rotates the latter in a clockwise direction about the pivot 49 out of the path of the trip lug, permitting the plunger to return to the normal position shown in the drawings without moving the clapper arm.

The switch plunger 53 is connected to the operating lever 34 through the link 54 and pin 55, the pin engaging the link through a slot 56 of sufficient length to permit the desired relative movement of the lever toward the arm to take place before actuation of the switch. A cover plate 66 of insulating material completes the housing of the switch.

The terminal contacts 44—45 of the switch are connected in series with the primary winding of the transformer and the terminals 57—58 of a plug connector 59 mounted in the transformer housing for connection with a suitable source of alternating current. This circuit connection may be traced from terminal 57 over wire 60, primary winding 61 of the transformer, conductor 62, switch contacts 44—45, conductor 63 to plug contact 58. Thus upon closure of the switch, the bridging of contacts 44—45 closes the primary circuit to the source energizing the transformer and supplying welding current to the electrodes.

Figure 4:
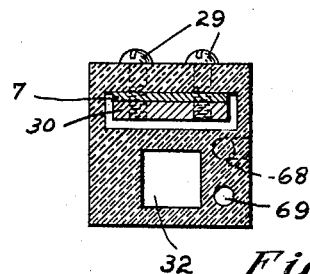
Fig. 4 is a section on line 4—4 of Fig. 3 with the conductors and spring mounting in place.
Figure 6:
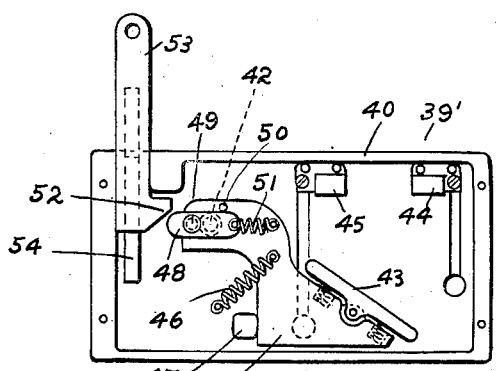
Fig. 6 is a side elevation of the switch on a larger scale than that of Fig. 1, and with the cover plate removed.

To keep the high potential, primary circuit conductors 62—63 well insulated from each other and from the secondary lead 13, and well housed to protect them from exposure and contact with outside objects, they are led into the switch 39 through separate channels or ducts in the body material of the arm 5 and arm base 6 as indicated in dotted lines Fig. 1, and as shown in section in Fig. 4. An angular cover plate 67 of sheet material, preferably perforated sheet metal, completes the housing of the transformer.

It is to be noted that a marked advantage of the use of the single, continuous, flexible conductor for the secondary winding and leads connecting the winding with the electrodes, is that it permits the use of a torus type transformer with closed ring laminations, the flexible conductor being readily applied as a secondary winding of large section and few turns, as well as being capable of adapting itself to the different positions of the movable arm in the operation of the machine without strain on the parts.

In use, the machine as a whole is secured to a suitable base board or table top 64 by suitable fastening means such as the screws 65 passed through the flanged base 4.

From the above description, it will be clear that in operation, with the primary circuit connected to a suitable source of alternating current through the socket plug 59, downward movement of the operating handle 36 acting through compression spring 37 will move the movable electrode 9 down into engagement with the work as shown in Fig. 2, whereupon further downward movement of the lever 37 causes it to move toward the movable arm 5 compressing the spring 37 to clamp the work W between the electrodes under increasing pressure until the lost motion of the pin and slot connection 55—56 is taken up and the switch plunger 53 moved down to raise the bridging contact 43 into engagement with contacts 44—45, whereupon the primary circuit of the transformer is closed during the brief period of the passage of the flat vertical portion of the trip lug 52 past the trip 40, after which the switch is opened in the manner above described. During the brief closure of the primary circuit, low potential, high amperage, welding current is supplied from the secondary winding 11 through the current leads 12—13, electrodes 8—9 and the work W to make the weld. The operator now releasing the handle 36, the movable arm 5 returns to the normal raised position under tension of spring hinge 7 while the compression spring 37 raises the lever 37 away from the arm back to the normal position shown in Fig. 1, the upward swing of the lever taking up the lost motion in the connection 55—56 and drawing the switch plunger 53 to the uppermost position.

While I have thus shown and described a specific embodiment of my invention for the sake of disclosure, it is to be understood that the invention is not limited to such specific embodiment, but contemplates all such modifications and variants thereof as fall fairly within the scope of the appended claims.

What I claim is:

1. In a miniature spot welding machine, a transformer and housing therefor, a rigid arm hingedly connected to the transformer casing, a welding electrode carried by said arm, and a single unitary flexible non-resilient conductor forming the secondary winding of the transformer and extending through the transformer housing and said arm to the electrode, the extended portion of said conductor being completely enclosed in and surrounded by the body material of said arm.

2. In a miniature spot welding machine, a welding transformer, a pair of electrodes, a housing of insulating material for the transformer, a pair of electrode supporting arms solely of insulating material one for each electrode, carried by the transformer housing, a pair of conductors leading from the secondary winding of the transformer one to each of said electrodes, each passing through and entirely surrounded by the body material of each of said arms respectively, a control switch mounted on one of said arms, and a pair of control circuit conductors included in the primary circuit of the transformer extended from the transformer to the switch through and entirely surrounded by the body material of said switch carrying arm, said control conductors being separated from each other by the body material of said switch carrying arm.

ALBERT MEADOWCROFT.